United States Patent
Ryl et al.

(10) Patent No.: US 6,234,518 B1
(45) Date of Patent: May 22, 2001

(54) MOTOR VEHICLE SEAT HAVING A SIDE AIR BAG ARRANGED IN THE BACKREST

(75) Inventors: Axel Ryl, Hannover; Norbert Scheuren, Grafenau; Ulf Schophaus, Bochum, all of (DE)

(73) Assignee: Micro Compact Car Smart GmbH, Renningen (DE)

(*) Notice: Subject to any disclaimer, the term of this patent is extended or adjusted under 35 U.S.C. 154(b) by 0 days.

(21) Appl. No.: 09/457,762

(22) Filed: Dec. 10, 1999

(30) Foreign Application Priority Data

Dec. 10, 1998 (DE) ............................................... 198 56 972

(51) Int. Cl.[7] .................................................. B60R 21/22
(52) U.S. Cl. .................................. 280/730.2; 297/216.13; 297/452.38
(58) Field of Search ........................... 280/730.2, 730.1; 297/216.13, 216.1, 452.38

(56) References Cited

U.S. PATENT DOCUMENTS 5,816,660 * 10/1998 Johnson, III et al. .......... 297/216.33
5,951,039 * 9/1999 Severinski et al. ............... 280/730.2
6,089,595 * 7/2000 Enders .............................. 280/730.2

FOREIGN PATENT DOCUMENTS

19642938 A1   5/1997  (DE) .
19632586 A1   2/1998  (DE) .
19729472 C1  11/1998  (DE) .

* cited by examiner

Primary Examiner—Peter C. English
(74) Attorney, Agent, or Firm—Evenson, McKeown, Edwards & Lenahan, P.L.L.C.

(57) ABSTRACT

A motor vehicle seat includes a backrest frame having a cutout in its side area for the passage of the side air bag. The cutout is closed off to the front by a bridge plate and the edges of the cutout are bordered by a panel. The panel is made of legs having a two-cheek construction, with an inner and an outer cheek. The outer cheeks reach over the cutout edges and the inner cheeks project inwardly The panel has a C-shape and, in the installed position, is open toward the bridge plate. The ends of the upper and lower inner cheeks of the panel are bent toward one another and thus form guiding surfaces for the air bag housing.

4 Claims, 7 Drawing Sheets

MOTOR VEHICLE SEAT HAVING A SIDE AIR BAG ARRANGED IN THE BACKREST

BACKGROUND OF THE INVENTION

This application claims the priority of German Patent Document 198 56 972.6, filed Dec. 10, 1998, the disclosures of which is expressly incorporated by reference herein.

The present invention relates to a motor vehicle seat having a side air bag.

A motor vehicle seat is known from German Patent Document DE 197 29 472 C1. The panel framing the air bag housing, relative to the mounted position, comprises (1) a rearward leg; (2) an upper leg; (3) a lower leg; and (4) a forward leg, and therefore is closed in a surrounding manner. With the exception of the forward leg, all legs of the panel have a two-cheek construction, with an outer cheek and an inner cheek. On the interior sides of the inner cheeks, detent noses are provided which, when the panel is pushed on, engage behind the sheet metal edges of a cutout. The forward leg is adjacent to the bridge plate and is constructed as a strip which, when the panel is in the mounted position, projects toward the interior and the side. On the inward-projecting part, three detent noses are arranged which project into the plane of an interior clamping strip formed of several sections. A shorter exterior clamping strip is situated opposite the interior clamping strip. When the panel is pushed onto the cutout, the detent noses engage in corresponding openings of the bridge plate. The exterior clamping strip is simultaneously pushed onto the exterior side of the bridge plate so that this bridge plate is clamped in between the interior and the exterior clamping strip. In this manner, the panel is fastened on all sides at the cutout or on one side on the bridge plate.

From German Patent Documents DE 196 42 938 A1 and DE 196 32 586 A1, panels for side air bags are known. However, these panels are not used for guiding the air bag housing because they are fastened to the housing or are constructed in one piece with the housing.

SUMMARY OF THE INVENTION

It is an object of the present invention to provide a vehicle seat having a panel for covering an air bag outlet, while maintaining its advantages.

This object is achieved by means of a motor vehicle seat according to the present invention. In the panel according to the present invention, in comparison to known panels, the forward leg, which has a fairly complicated construction, is eliminated. This reduces the costs for the injection molding dies as well as the costs of the material. Furthermore, no panel part will now be situated in the range of the inflating path of the air bag. As a result, the inflating air bag reliably will not impact the panel, which might otherwise possibly splinter parts off the panel that can fly around in the occupant compartment and endanger the occupants.

Despite the elimination of the forward leg and the connected simpler construction of the panel, this panel remains fully operable. The ends of the inner cheeks of the upper or lower leg of the panel (which are pulled in toward the bottom or toward the top) form contact surfaces for the air bag housing and are completely sufficient for its lateral guidance. These guiding surfaces are also sufficiently rigid because they are reinforced on their exterior side by the molded-on detent noses. These detent noses are used for locking the panel to the bridge plate so that the panel is reliably fastened on all sides in the cutout.

Other objects, advantages and novel features of the present invention will become apparent from the following detailed description of the invention when considered in conjunction with the accompanying drawings.

DETAILED DESCRIPTION OF THE DRAWINGS

Figure 1:
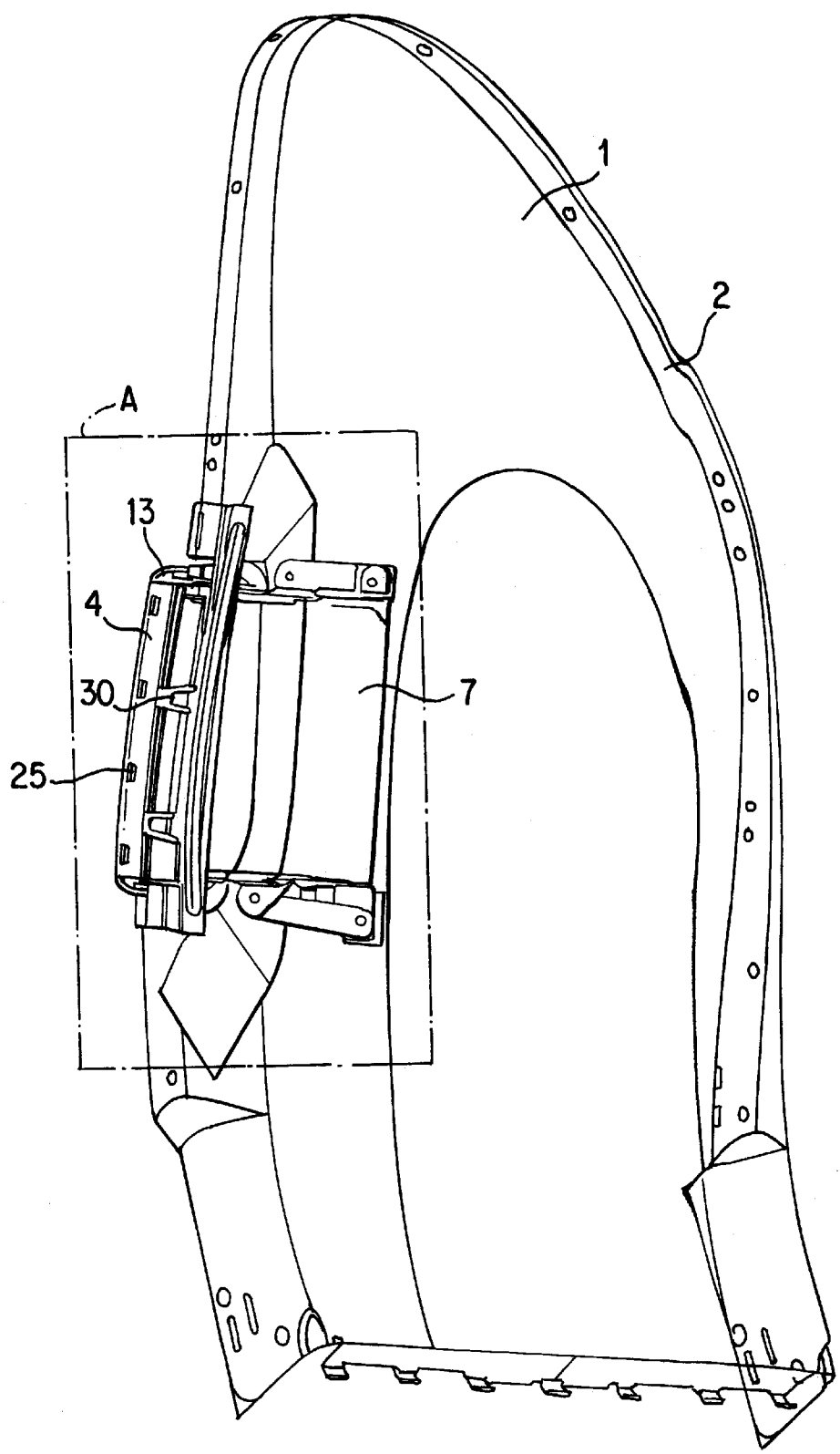
FIG. 1 is a perspective representation of a backrest without cushion parts with the installed side air bag according to the present invention.

The backrest illustrated in FIG. 1 has a backrest shell 1 made of deep-drawn sheet metal, in whose edge area surrounding sheet metal profiles are welded in for stiffening purposes. Together with the backrest shell 1, the sheet metal profiles 2 form the supporting structure of the backrest and, in the following, are called a backrest frame. The additionally shown parts of the backrest frame have no significance with respect to the invention and will therefore not be explained in detail.

Figure 7:
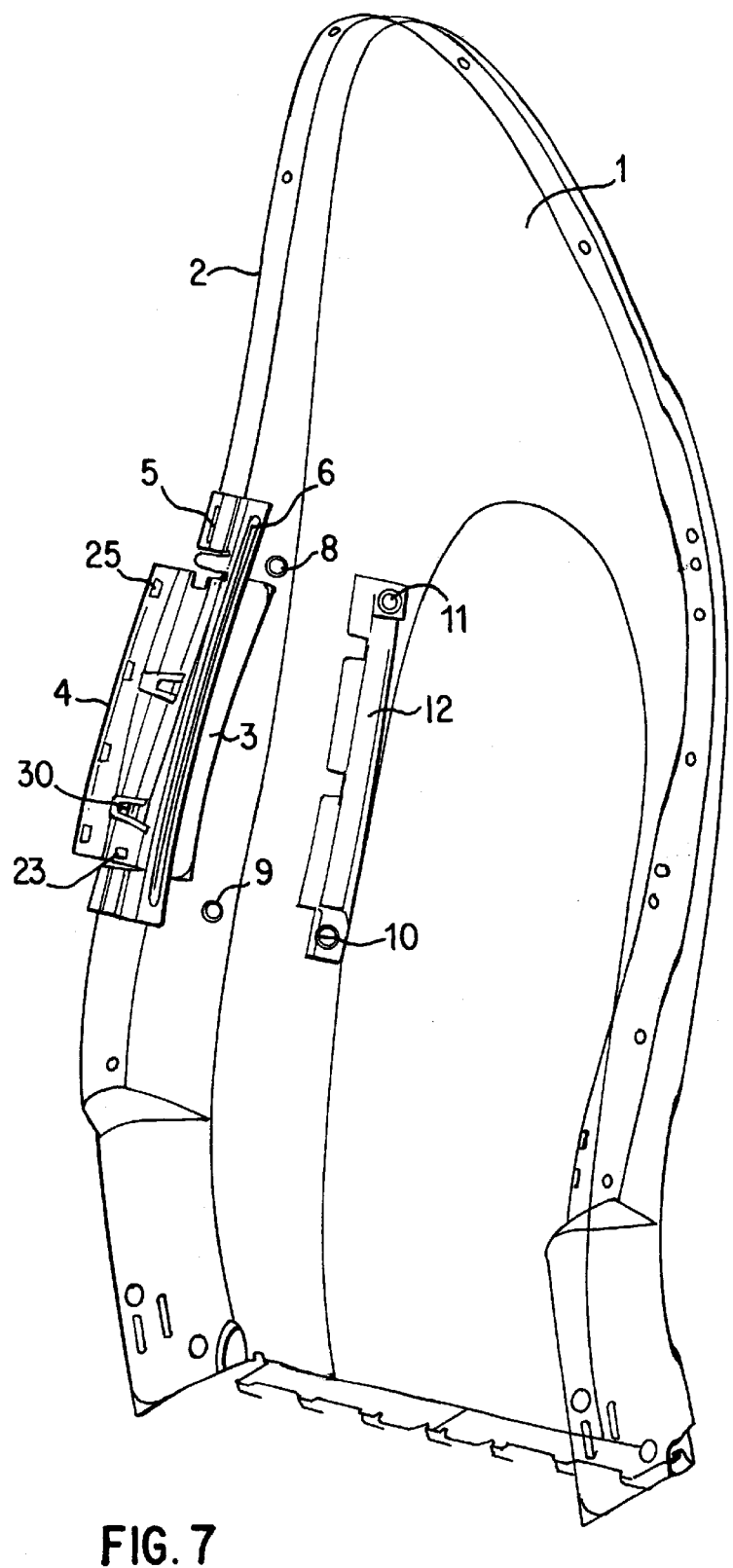
FIG. 7 is a representation according to FIG. 1 while the side air bag is not mounted.

As best illustrated in FIG. 7, the backrest frame has a cutout 3 in its side area, which cutout 3 is closed toward the front by means of a bridge plate 4 which is welded onto the backrest frame by means of slot welds 5. The bridge plate 4 has a larger plate thickness than the backrest frame and has profilings and beads 6 for the reinforcement. It reinforces the backrest frame in the edge area of the cutout 3.

The cutout 3 forms an outlet opening for a side air bag housing 7, whose construction corresponds to the state of the art and therefore does not have to be explained further. For fastening the air bag housing 7, four fastening points are provided on the backrest frame and are formed by punch nuts 8 to 11. Two of these punch nuts 8, 9 are arranged in the sheet metal profile 2. The other two punch nuts 10, 11 are part of a holding plate 12 which is welded to the backrest shell 1 (FIG. 7).

A panel 13 made of a plastic material is pushed onto the edge of the cutout 3. The construction of this panel 13 is illustrated in FIGS. 3 to 6 and is described below.

The upper leg 14, the rearward leg 15, and the lower leg 16 of the panel 13 relative to the mounted position always have a two-cheek construction, with an inner cheek 17 and an outer cheek 18. The inner cheeks 17 and the outer cheeks 18 project from one another in a V-shape. In the wedge between the outer cheek 18 and the inner cheek 17 of the rearward leg 15, the cheeks are stiffened with respect to one another by triangular webs 19. On the interior sides of the inner cheeks 17, detent noses 20 are arranged, specifically three on the rearward leg 15 and one on the upper leg 14 and lower leg 16, respectively.

Figure 5:
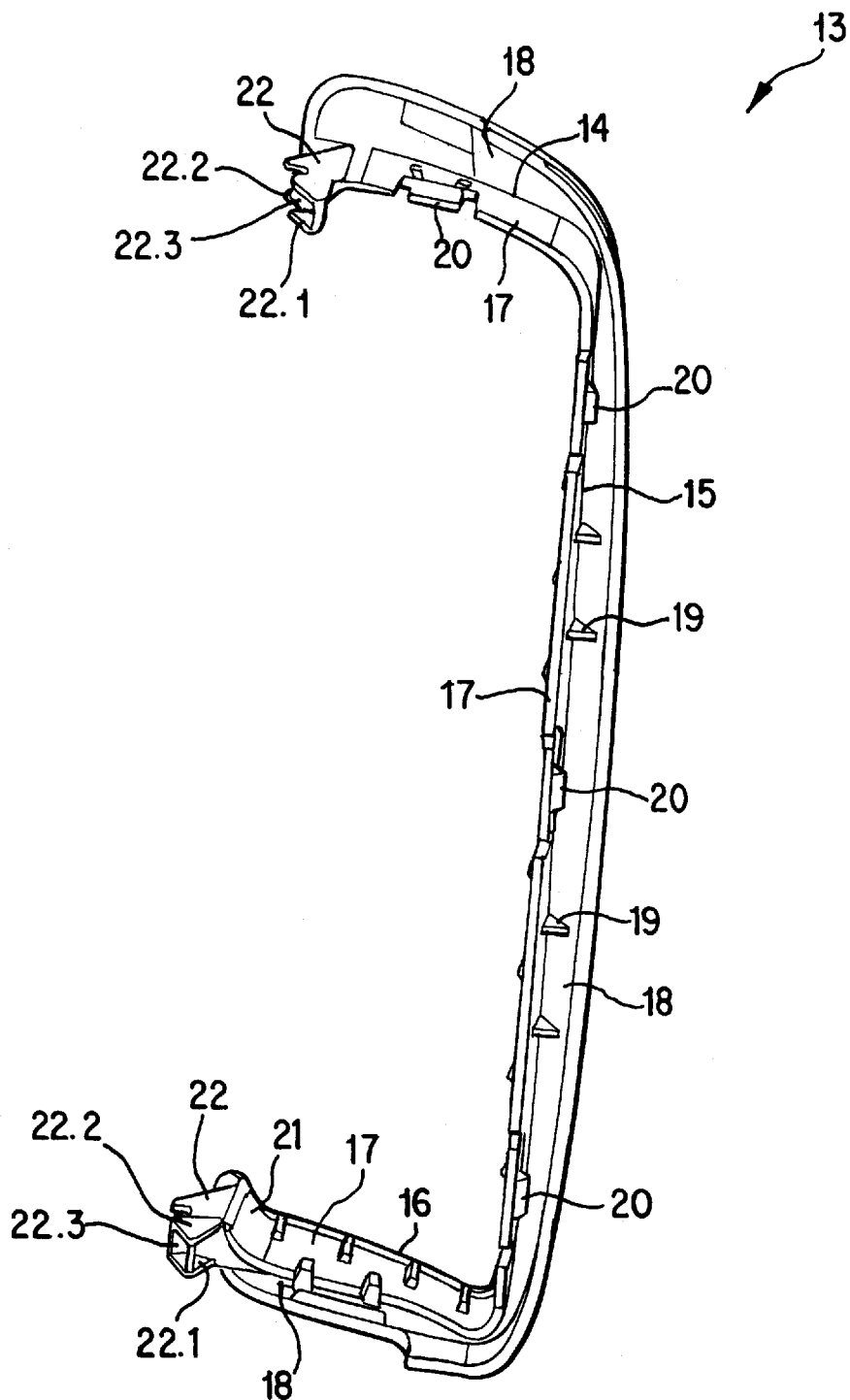
FIG. 5 is a perspective representation according to FIG. 4, viewed diagonally from the rear and from above.
Figure 6:
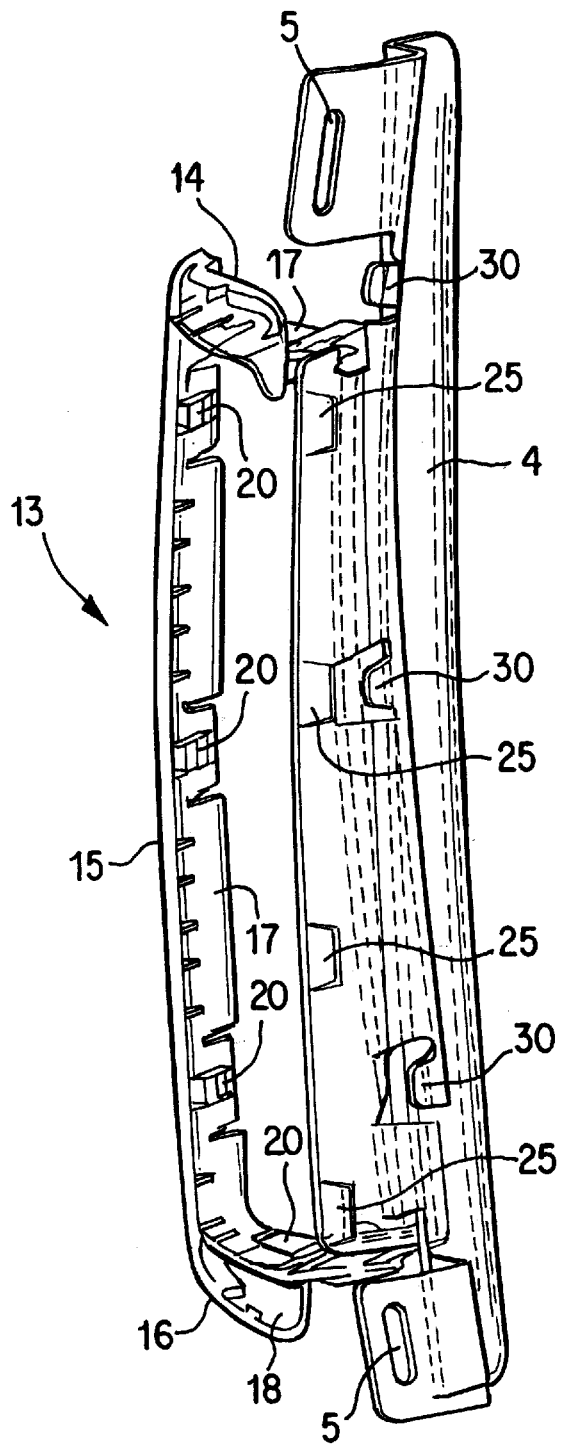
FIG. 6 is a perspective representation of the bridge plate with the engaged panel, viewed approximately in the direction of the arrow B according to FIG. 3.

The ends of the upper and lower inner cheek 17 are bent toward one another, whereby guiding surfaces 21 are formed for the assigned side wall of the air bag housing 7. FIG. 5 shows the construction of this guiding surface 21 on the lower leg 16 of the panel 13. In an identical manner, this guiding surface 21 also exists on the upper leg 14 of the panel 13, which is not shown in the drawing.

The two guiding surfaces 21 are each reinforced by a detent nose 22 which adjoins on the outside. These detent noses 22 have two parallel walls 22.1 and 22.2 which are stiffened with respect to one another by means of a web 22.3. Thus, the detent noses 22 have a relatively strong construction.

The mounting of the panel 13 and of the air bag housing 7 takes place as follows: The panel 13 is pushed from the outside onto the framing of the cutout 3 and is then pressed in. In this case, the upper, rearward and lower plate edges of the cutout 3 first move onto the forward bevels 20.1 (FIG. 3) of the detent noses 20, whereby the inner cheeks 17 deflect toward the inside along their entire length and then, after passing over the detent noses 20, engage behind the noses.

Figure 2:
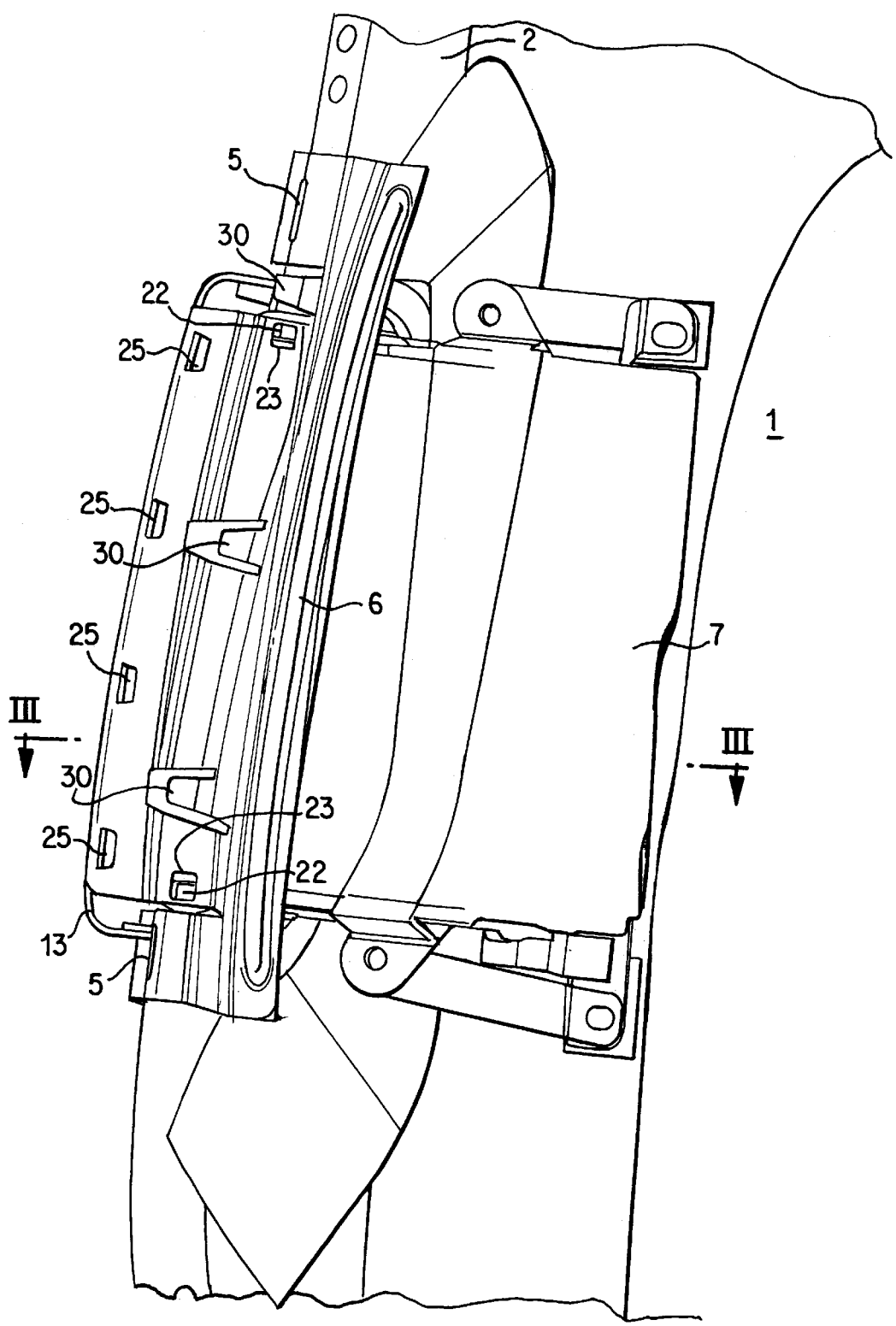
FIG. 2 is an enlarged representation of the cutout A according to FIG. 1.
Figure 3:
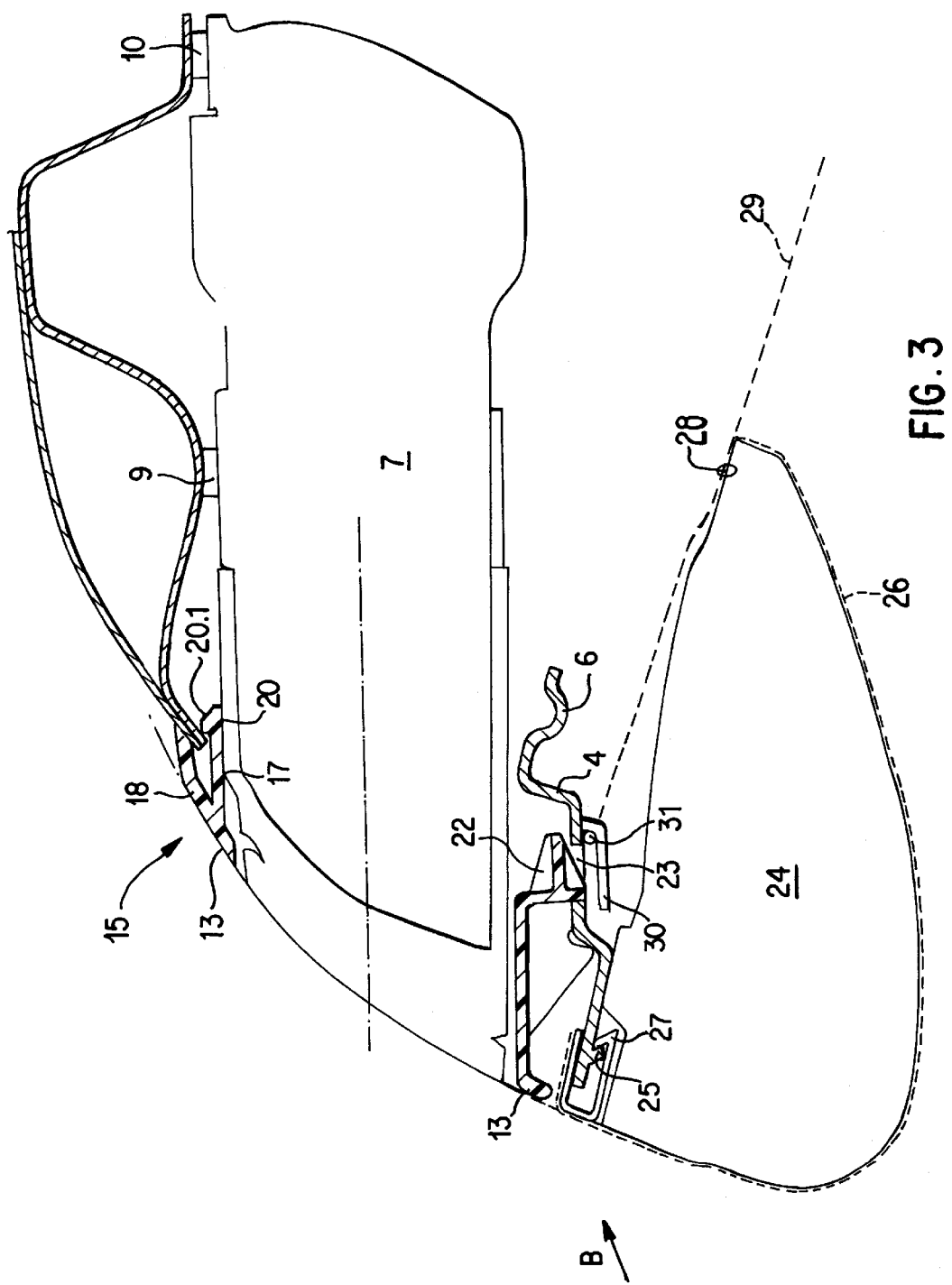
FIG. 3 is a sectional view III—III according to FIG. 2 with an outlined side cushion.
Figure 4:
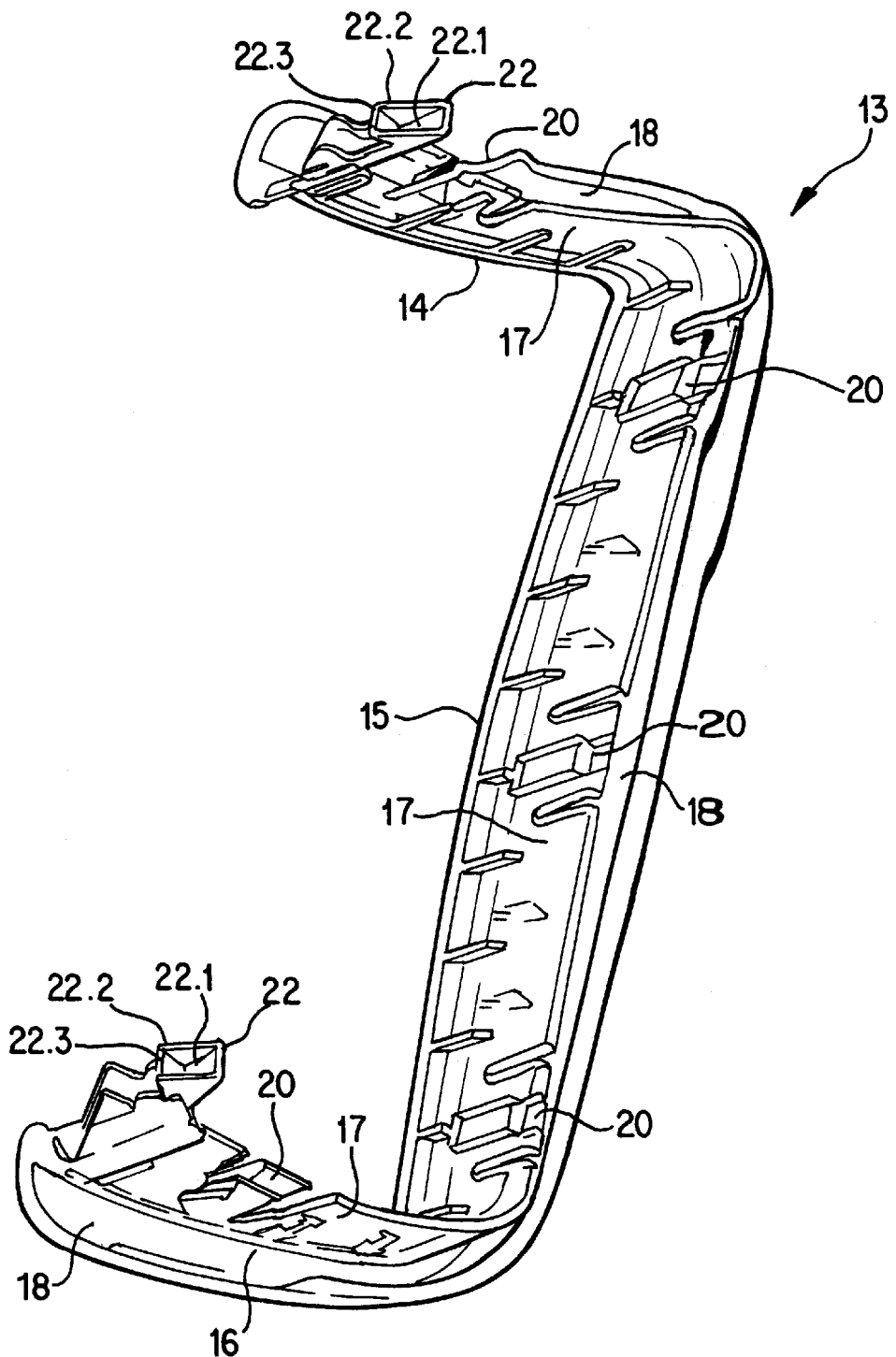
FIG. 4 is a perspective individual representation of the panel in the installed position, viewed from the interior, diagonally from the front and from below.

Simultaneously, with the above-described operation, the detent noses 22 at the end of the upper leg 14 and of the lower leg 16 of the panel 13 move onto the interior side of the bridge plate 4 and then engage in corresponding openings 23 (FIG. 2; FIG. 3) provided in the bridge plate 4.

At the end of the above-described pressing-on operation, the panel 13 is very firmly disposed on the framing of the cutout 3. Tolerances of the cutout 3 are compensated in that the detent noses 20 have a radial course so that the upper, lower and rearward plate edge of the cutout 3 are still securely clamped in even in the case of variations in dimension.

After the mounting of the panel 13, the air bag housing 7 can be installed. For this purpose, the air bag housing 7 is pushed from the interior through the panel opening to the outside. The interior sides of the inner cheeks 17 as well as their guiding surfaces 21 formed by the recesses at the end of the legs 14 and 16 are used as a guide. Simultaneously, the panel 13 protects the air bag housing 7 from being damaged because the sharp plate edges of the cutout 3 are covered. Subsequently, the air bag housing 7 is screwed to the punch nuts 8 to 11. This concludes the mounting of the air bag housing 7.

The panel 13 surrounds the air bag housing 7 with its legs 14, 15 and 16 only by means of a small play, so that a uniform small edge gap is formed. Furthermore, the outer cheeks 18 of the panel 13 rest tightly against the bordering of the cutout 3, and the inner cheeks 17 on the air bag housing 7. This results in a visually attractive connection to the air bag housing 7 and to the backrest frame.

As illustrated in FIG. 3, in the mounted condition, the air bag housing 7 projects laterally a distance out of the backrest contour. Toward the front, it is covered by a side cushion 24 as well as by the outward-projecting bridge plate 4. The bridge plate 4 is provided with fastening hooks 25 for a covering material 26 of the side cushion 24 indicated in FIG. 3 by a broken line. For the hanging into these fastening hooks 25, the covering material 26 is equipped with hook profiles 27 on its exterior edge. On the interior side, the side cushion 24 is snapped by means of its covering material 26 at the point indicated by a circle 28 into a covering 29 of the backrest, which may, for example, be a net structure. The side cushion 24 is therefore fastened in a secure manner but can easily be removed again by releasing the hooked or snapped connection. The covering 29, in turn, is hung onto tongues 30 pressed out of the bridge plate 4 and, for this purpose, are provided at their edge with a suspension wire 31 (FIG. 3).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle seat, comprising:
    a backrest frame having a cutout in a side area;
    a bridge plate reinforcing the backrest frame;
    a side air bag arranged in the backrest frame; and
    a panel having a C-shape that borders edges of the cutout, said panel comprising legs having inner and outer cheeks, wherein the outer cheeks reach over the cutout edges and the inner cheeks project inwardly;
    wherein the panel, in an installed position, is open toward the bridge plate,
    wherein ends of upper and lower inner cheeks of the panel are bent, thereby forming guiding surfaces for the air bag housing, and
    wherein the ends of the upper and lower inner cheeks are reinforced by at least one detent nose for locking the panel with the bridge plate.

2. A motor vehicle seat according to claim 1, wherein said panel is plastic.

3. A motor vehicle seat according to claim 1, wherein said panel comprises three legs, each having an inner cheek and an outer cheek.

4. Method of making a motor vehicle seat having a side air bag housing, comprising the acts of:
    providing a backrest frame for the motor vehicle seat having a cutout in a side area;
    mounting a bridge plate reinforcing the backrest frame;
    providing a panel having a C-shape with legs having inner and outer cheeks, wherein ends of the inner cheeks are bent, thereby forming guiding surfaces for the air bag housing, and the ends of the inner cheeks are reinforced by at least one detent nose; and
    pressing the panel onto edges of the cutout whereby the outer cheeks reach over the cutout edges, the inner cheeks deflect toward the inside and the cutout edges engage the panel between the inner and outer cheeks, and whereby the panel is open toward the bridge plate and the detent noses engage the bridge plate to lock the panel with the bridge plate.

* * * * *